(12) United States Patent
Lubben

(10) Patent No.: US 7,001,293 B2
(45) Date of Patent: Feb. 21, 2006

(54) CONTINUOUSLY VARIABLE TRANSMISSION (CVT) ASSEMBLY AND METHOD OF AXIALLY POSITIONING PULLEY MEMBERS OF A CVT

(75) Inventor: Jeffrey L. Lubben, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 104 days.

(21) Appl. No.: 10/218,717

(22) Filed: Aug. 14, 2002

(65) Prior Publication Data

US 2004/0033851 A1 Feb. 19, 2004

(51) Int. Cl.
*F16H 55/56* (2006.01)
*F16H 43/00* (2006.01)
*F16H 23/10* (2006.01)

(52) U.S. Cl. .......................... 474/8; 384/540; 384/519

(58) Field of Classification Search ................. 474/18, 474/28, 46, 70, 199, 12, 8; 477/45, 46, 49; 475/220, 210; 384/540, 906, 438, 519, 441, 384/252, 494; 416/205
See application file for complete search history.

(56) References Cited

U.S. PATENT DOCUMENTS

| | | | | |
|---|---|---|---|---|
| 4,026,399 A | * | 5/1977 | Ladin | 384/612 |
| 4,240,677 A | * | 12/1980 | Payne et al. | 384/252 |
| 4,273,391 A | * | 6/1981 | Asberg | 384/494 |
| 4,435,997 A | | 3/1984 | van Doorne | 74/796 |
| 4,850,801 A | * | 7/1989 | Valentine | 416/205 |
| 5,439,419 A | * | 8/1995 | Yamada et al. | 474/18 |
| 5,601,509 A | | 2/1997 | Munoz | 476/53 |
| 6,089,999 A | * | 7/2000 | Imaida et al. | 474/18 |
| 6,280,357 B1 | | 8/2001 | Van Spijk | 474/16 |
| 6,348,019 B1 | | 2/2002 | Yuan | 474/8 |
| 6,361,456 B1 | * | 3/2002 | Walter | 474/18 |
| 2002/0183156 A1 | * | 12/2002 | Gradu et al. | 475/220 |

FOREIGN PATENT DOCUMENTS

| | | | | |
|---|---|---|---|---|
| DE | 3638512 A1 | * | 5/1987 | |
| JP | 02-21052 A | * | 1/1990 | |
| JP | 05-141430 A | * | 6/1993 | |

* cited by examiner

*Primary Examiner*—Marcus Charles
(74) *Attorney, Agent, or Firm*—Christopher DeVries

(57) ABSTRACT

A continuously variable transmission (CVT) assembly includes first and second pulley pairs having a drive belt extended therebetween. A transmission case cover includes a threaded aperture. A threaded sleeve and bearing assembly is positioned on a stationary pulley member and threadedly engaged with the threaded aperture. The threaded sleeve and bearing assembly is engaged with the stationary pulley member such that rotation of the threaded sleeve and bearing assembly causes axial adjustment of the stationary pulley member. A lock feature locks the threaded sleeve and bearing assembly in the desired rotational position, thereby locking the stationary pulley member in an axially adjusted position.

6 Claims, 2 Drawing Sheets

CONTINUOUSLY VARIABLE TRANSMISSION (CVT) ASSEMBLY AND METHOD OF AXIALLY POSITIONING PULLEY MEMBERS OF A CVT

TECHNICAL FIELD

The present invention relates to a method and apparatus for axially positioning stationary pulley members of a continuously variable transmission.

BACKGROUND OF THE INVENTION

Continuously variable transmission (CVT) assemblies typically include first and second pairs of pulley cones having a torque transmitting belt extending there between. Each pulley cone pair includes an axially stationary pulley member and an axially movable pulley member configured to engage a torque transmitting drive belt extending between the first and second pulley cone pairs. Each movable pulley member is axially adjustable with respect to the stationary pulley member by a hydraulic system providing primary and secondary hydraulic pressures to the respective movable pulley members to thereby adjust the running radius of the first and second pulley cone pairs to adjust the output/input ratio of the continuously variable transmission.

Continuously variable transmission assemblies typically include a control system which controls respective adjustment of the movable pulley members in a manner to properly adjust the output/input ratio of the CVT while avoiding slippage of the torque transmitting belt. These control systems require that the stationary pulley members be properly positioned to enable accurate adjustment of the movable pulley members to control the CVT assembly.

Stationary pulley member alignment or positioning may be set by measuring the height of each stationary pulley (i.e., the distal end of each stationary pulley) and the case cover. A desired height (axial position) is then determined based on these measurements. The resulting overall height is compared to a look-up table to determine which of a plurality of spacers is required to be inserted into the assembly to properly align the pulleys.

It is desirable to provide an improved continuously variable transmission (CVT) assembly in which the spacers are not required.

SUMMARY OF THE INVENTION

The present invention improves upon prior art CVT transmissions described above by providing an adjustment feature in which a threaded sleeve and bearing assembly is threaded into a transmission case cover. The threaded sleeve and bearing assembly abuts one of the stationary pulley members and is operative to adjust the stationary pulley member by rotatable adjustment of the threaded sleeve and bearing assembly. Such rotation of the threaded sleeve and bearing assembly causes axial movement of the threaded sleeve and bearing assembly as well as the respective stationary pulley member. Once rotationally adjusted to a desired position, the threaded sleeve and bearing assembly is locked in the selected rotational position to secure the respective stationary pulley member in a desired adjusted axial position.

More specifically, the continuously variable transmission (CVT) assembly includes first and second pulley pairs each including a stationary and a movable pulley member configured to engage a torque-transmitting drive belt extending between the first and second pulley pairs. A transmission case cover has a threaded aperture therein. A threaded sleeve and bearing assembly is positioned on the respective stationary pulley member of the first pulley pair and threadedly engaged with the threaded aperture. The threaded sleeve and bearing assembly are sufficiently engaged with the respective stationary pulley member such that rotation of the threaded sleeve and bearing assembly with respect to the transmission case cover causes axial adjustment of the respective stationary pulley member. A lock feature is positioned to lock the threaded sleeve and bearing assembly in a selected rotational position, thereby locking the respective stationary pulley member in an axially adjusted position.

Preferably, the threaded aperture is formed by a pressed-in sleeve which is pressed into the transmission case cover.

A bearing cover is connected to the transmission case cover over the threaded sleeve and bearing assembly. The bearing cover has the lock feature formed thereon. The sleeve and bearing assembly include a sleeve member having a plurality of circumferentially spaced slots formed therein for selective cooperation with the lock feature for locking the sleeve member in the selected rotational position.

The lock feature may be an integral lock tab extending from the bearing cover, or a bolted-on retainer.

The sleeve and bearing assembly includes a bearing race abutting the respective stationary pulley member and a snap ring securing a sleeve member to an outer bearing race.

In accordance with another aspect of the invention, in a continuously variable transmission (CVT) having first and second pulley pairs each including a stationary and a movable pulley member configured to engage a drive belt extending between the first and second pulley pairs, a method of axially positioning a respective stationary pulley member includes the following steps:

A) providing a transmission case cover having a threaded aperture therein;

B) providing a threaded sleeve and bearing assembly on the respective stationary pulley member and threadedly engaged with the threaded aperture;

C) rotating the threaded sleeve and bearing assembly with respect to the transmission case cover to thereby axially adjust the respective stationary pulley member; and D) locking the threaded sleeve and bearing assembly in a selected rotational position to thereby lock the respective stationary pulley member in a desired axial position.

The above objects, aspects, features and advantages, and other objects, aspect, features and advantages of the present invention are readily apparent from the following detailed description of the best modes for carrying out the invention when taken in connection with the accompanying drawings.

DESCRIPTION OF THE PREFERRED EMBODIMENT

Figure 1:
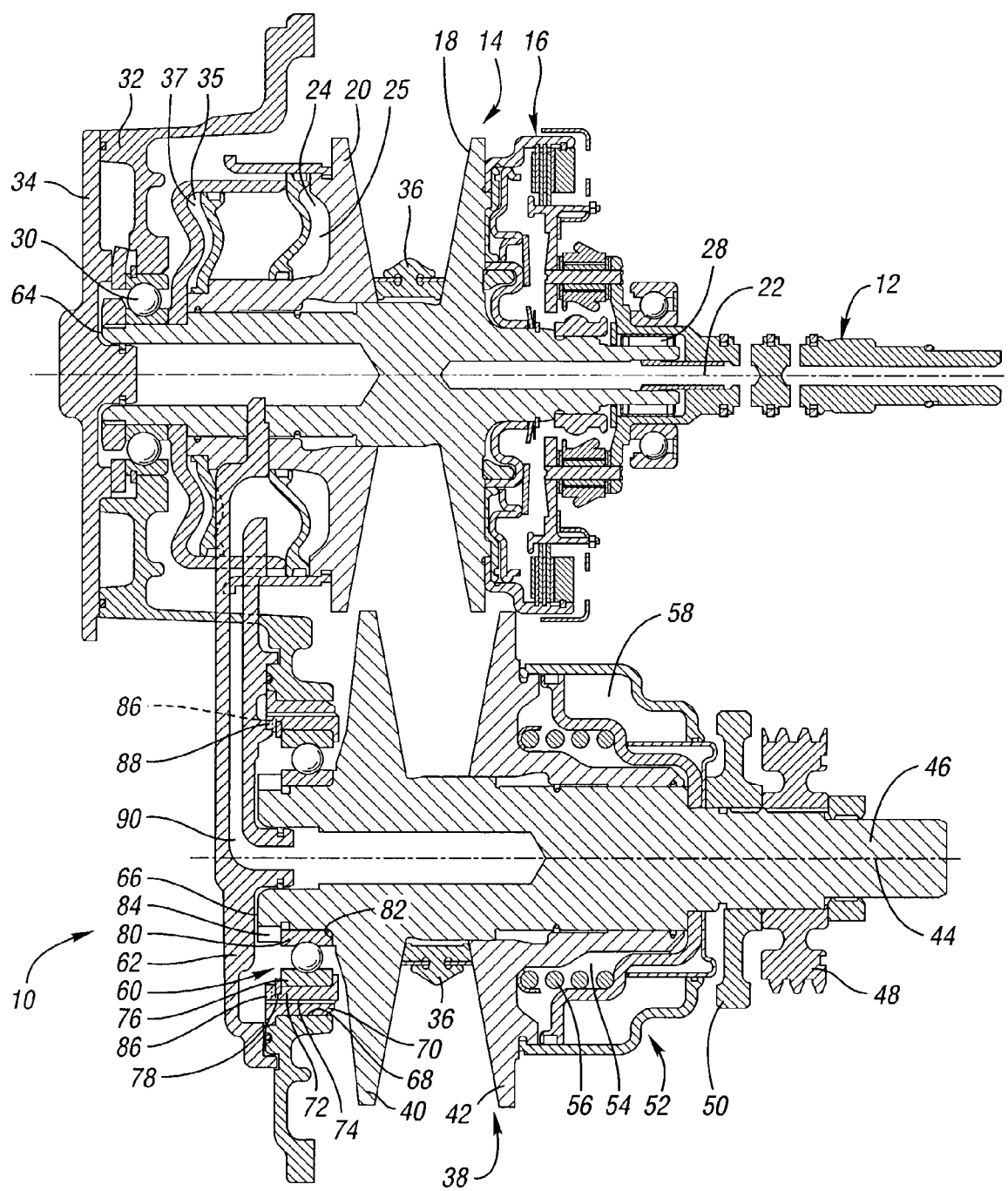
FIG. 1 shows a longitudinal cross-sectional view of a CVT assembly in accordance with the present invention.

FIG. 1 shows a partial longitudinal cross-sectional view of a continuously variable transmission (CVT) assembly 10 in accordance with a first embodiment of the invention. The CVT assembly 10 includes an input shaft 12 which selectively drives a first pulley pair 14 through a clutch assembly 16. The first pulley pair 14 includes an axially stationary pulley member 18 and an axially movable pulley member 20. The stationary pulley member 18 is axially stationary, but rotatable about the drive axis 22. The movable pulley 20 is axially movable as a result of pressure from the pressurized oil 24 positioned against the movable pulley 20. Accordingly, the movable pulley member 20 is axially movable with respect to the stationary pulley member 18 by application of high-pressure oil 24 in the piston chamber 25 and application of high pressure oil 35 in the piston chamber 37 to move the movable pulley 20 to the right as viewed in FIG. 1.

The stationary pulley member 18 is supported by bearings 28, 30. The stationary and movable pulley members 18, 20, and the piston, bearings, etc. are enclosed within the transmission case cover 32, and sealed by an end cover 34.

A torque transmitting drive belt 36 extends between the first pulley pair 14 and the second pulley pair 38. The drive belt 36 transmits torque from the first pulley pair 14 to the second pulley pair 38. The drive belt 36 is shown only in cross section, but extends between the pulley pairs 14, 38.

The second pulley pair 38 includes a stationary pulley member 40 and movable pulley member 42. The stationary and movable pulley members 40, 42 are rotatable about the driven axis 44.

As shown, the stationary pulley member 40 includes an integral pulley shaft 46, upon which a transfer gear 48, parking gear 50, and piston assembly 52 are positioned. The transfer gear 48 transfers power to a final drive from the pulley shaft 46. The parking gear 50 is operative to hold the CVT in a parked position. The piston assembly 52 is operative to axially adjust the movable pulley member 42 with respect to the stationary pulley member 40.

The piston assembly 52 includes a piston chamber 54 having high-pressure oil therein, a return spring 56 for under-drive start up, and a compensator chamber 58 having low pressure oil therein to compensate for the spinning effect of oil in the piston chamber 54. Accordingly, the highly pressurized fluid in the piston chamber 54 forces the movable pulley member 42 toward the stationary pulley member 40. In this manner, movement of the movable pulley member 42 toward or away from the stationary pulley member 40 causes the running radius of the drive belt 36 with respect to the driven axis 44 to be adjusted. Similarly, movement of the movable pulley member 20 toward or away from the stationary pulley member 18 changes the running radius of the drive belt 36 with respect to the drive axis 22. Accordingly, this pulley movement adjusts the distance between the drive belt 36 and the respective axes 22, 44, which establishes the running radius of the respective pulley pairs 14, 38, thereby adjusting the output/input ratio of the drive pulley (first pulley pair) 14 and the driven pulley (second pulley pair) 38.

The pulley shaft 46 is rotatably supported by a threaded sleeve and bearing assembly 60. The bearing cover 62 encloses the second pulley pair 38 and the threaded sleeve and bearing assembly 60 within the transmission case cover 30.

In order to properly control operation of the CVT 10, the stationary pulley members 18, 40 must be properly aligned or positioned so that respective movement of the movable pulley members 20, 42 may be accurately controlled.

In order to properly position the stationary pulley member 40 with respect to the stationary pulley member 18, the axial position of the distal end 64 of the stationary pulley member 18 is measured. The distal end 66 of the stationary pulley member 40 must then be properly positioned axially with respect to the distal end 64 of the stationary pulley member 18. In order to achieve this axial adjustment, the threaded sleeve and bearing assembly 60 is sufficiently engaged with the stationary pulley member 40 such that rotation of the threaded sleeve and bearing assembly 60 with respect to the transmission case cover 32 causes axial adjustment of the respective stationary pulley member 40. As shown, the transmission case cover 32 includes an aperture 68, and a threaded sleeve 70 is pressed into the aperture 68.

The threaded sleeve and bearing assembly 60 includes a sleeve member 72 having a threaded O.D. surface 74 which is threadedly engaged with the threads of the threaded sleeve 70. Accordingly, rotation of the threaded sleeve and bearing assembly 60 with respect to the transmission case cover 32 causes axial adjustment of the threaded sleeve and bearing assembly 60 along the driven axis 44.

The threaded sleeve and bearing assembly 60 further includes an outer bearing race 76 which is secured with respect to the sleeve member 72 by the snap ring 78. The threaded sleeve and bearing assembly 60 also includes an inner bearing race 80, which is secured against the radial surface 82 of the stationary pulley member 40 by a nut 84 which is threaded onto the distal end 66 of the pulley shaft 46.

Once the desired axial position of the distal end 66 of the stationary pulley member 40 is determined, the threaded sleeve and bearing assembly 60 is rotated to axially adjust the stationary pulley member 40 to the desired position. A lock feature is then engaged to lock the sleeve member 72 in the selected rotational position. A first embodiment of the lock feature is illustrated in FIG. 1. As shown, the sleeve member 72 includes a plurality of circumferentially spaced slots 86 formed thereon for selective cooperation with the lock feature for locking the sleeve member 72 in the selected rotational position. The circumferentially-spaced slots 86 are more clearly visible in FIG. 2.

Returning to FIG. 1, in this embodiment, the lock feature comprises a lock tab 88 which is integrated into the bearing cover 62. Accordingly, when the threaded sleeve and bearing assembly 60 has been rotated and thereby adjusted to a selected axial position to properly adjust the axial position of the stationary pulley member 40, the bearing cover 62 is then positioned over the stationary pulley member 40 so that the lock tab 88 is inserted into the selected slot 86, thereby preventing further rotation of the sleeve member 72, and locking the stationary pulley member 40 in the adjusted axial position. As shown, the bearing cover 62 also includes an oil feed channel 90 formed therein for delivering oil to the piston chamber 54.

Figure 2:
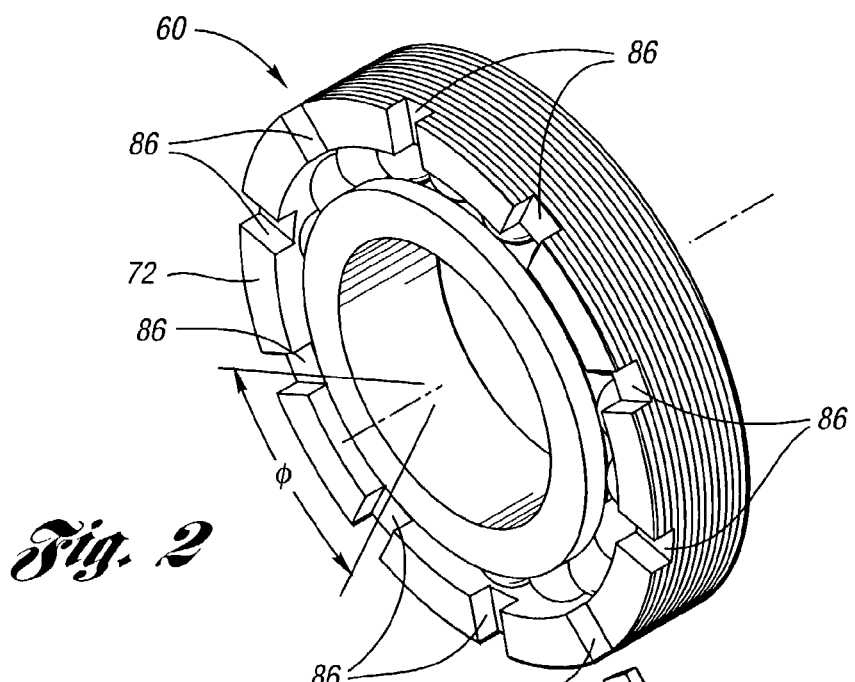
FIG. 2 shows a partially exploded perspective view of a threaded sleeve and bearing assembly, lock feature, and cap screw in accordance with an alternative embodiment of the invention.
Figure 3:
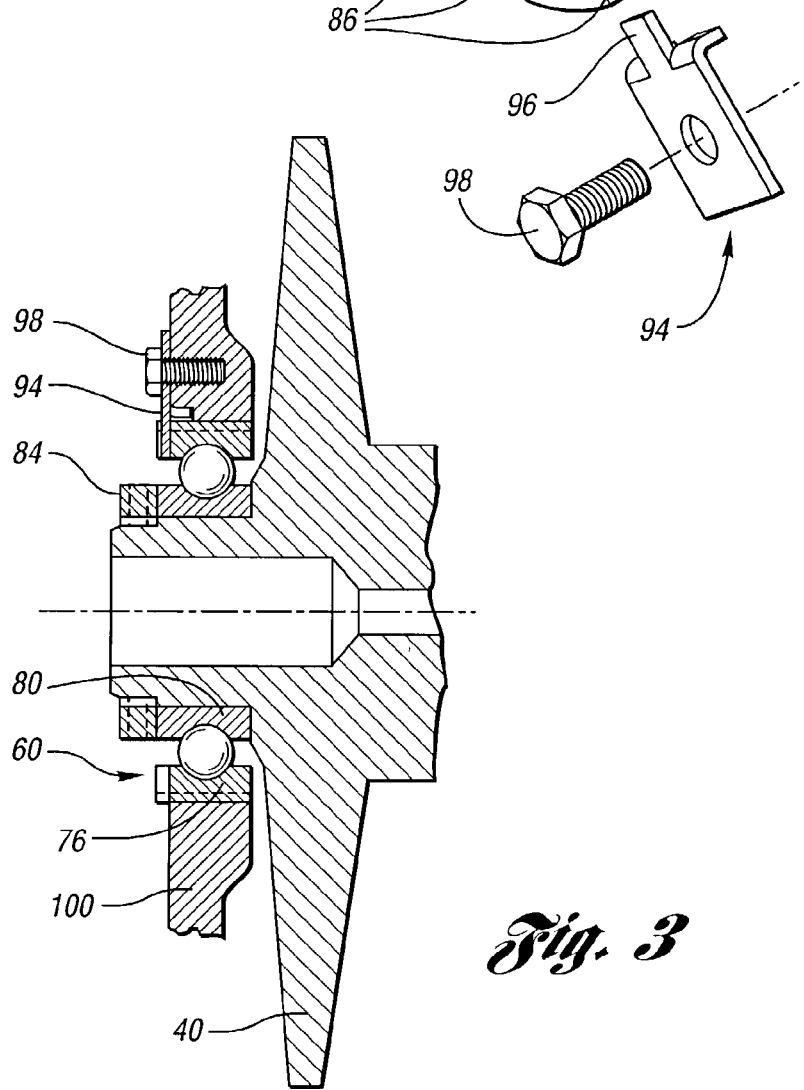
FIG. 3 shows a vertical cross-sectional view of a threaded sleeve and bearing assembly, lock feature, cap screw, and stationary pulley member in accordance with the embodiment of FIG. 2.

Turning to FIGS. 2 and 3, a second embodiment of the invention is shown in which the lock feature is not configured as in integral lock tab in the bearing cover 62. In FIGS. 2 and 3, like reference numerals are used to describe like components of FIG. 1. Accordingly, the threaded sleeve and bearing assembly 60 is shown. The circumferentially-spaced slots 86, referenced above with respect to FIG. 1, are more clearly illustrated.

In the embodiment of the invention illustrated in FIGS. 2 and 3, the lock feature is a bolted-on retainer member 94 having a lock finger 96 which may be positioned in the selected circumferential slot 86 of the sleeve member 72, and locked in position by bolting the cap screw 98 to the transmission case 100 to secure the stationary pulley member 40 in the desired axial position, after the threaded sleeve and bearing assembly 60 has been rotatably adjusted to the desired position.

Accordingly, a method is provided for axially adjusting a stationary pulley member in a continuously variable transmission as follows:

A) providing a transmission case cover 32 having a threaded aperture therein (formed by threaded sleeve 70);

B) providing a threaded sleeve and bearing assembly 60 on the stationary pulley member 40 and threadedly engaged with the threaded aperture 70;

C) rotating the threaded sleeve and bearing assembly 60 with respect to the transmission case cover 32 to thereby axially adjust the stationary pulley member 40 as a result of engagement between the threaded sleeve and bearing assembly 60 and the stationary pulley member 40; and D) locking the threaded sleeve and bearing assembly 60 in a selected rotational position by engagement of a lock feature (88 or 96) to thereby lock the stationary pulley member 80 in the desired axial position.

In this manner, during assembly of the CVT, the distal end 66 of the stationary pulley 40 may be properly positioned with respect to the distal end 64 of the stationary pulley 18, thereby simplifying the assembly process. The assembly process is simplified because only one measurement is required (i.e., the position of the distal end 64 of the stationary pulley member 18). The present invention may also simplify service of the CVT assembly in the field. The design also improves packaging space and reduces part count by eliminating the prior art spacers.

While the best modes for carrying out the invention have been described in detail, those familiar with the art to which this invention relates will recognize various alternative designs and embodiments for practicing the invention within the scope of the appended claims.

What is claimed is:

1. A continuously variable transmission (CVT) assembly comprising:
    first and second pulley pairs each including a stationary and a movable pulley member configured to engage a drive belt extending between the first and second pulley pairs;
    a transmission case cover having a threaded aperture;
    a threaded sleeve and bearing assembly positioned on the stationary pulley member of the first pulley pair and threadedly engaged with the threaded aperture, said threaded sleeve and bearing assembly being sufficiently engaged with said stationary pulley member such that rotation of the threaded sleeve and bearing assembly with respect to the transmission case cover causes axial adjustment of said stationary pulley member;
    a lock feature positioned to lock the threaded sleeve and bearing assembly in a selected rotational position, thereby preventing said stationary pulley member from moving axially; and
    a bearing cover connected to the transmission case cover over the threaded sleeve and bearing assembly, said bearing cover including the lock feature thereon;
    wherein said sleeve and bearing assembly includes a sleeve member having a plurality of circumferentially spaced slots formed therein for selective cooperation with the lock feature for locking the sleeve member in the selected rotational position.

2. A continuously variable transmission (CVT) assembly comprising:
    first and second pulley pairs each including a stationary and a movable pulley member configured to engage a drive belt extending between the first and second pulley pairs;
    a transmission case cover having a threaded aperture;
    a threaded sleeve and bearing assembly positioned on the stationary pulley member of the first pulley pair and threadedly engaged with the threaded aperture, said threaded sleeve and bearing assembly being sufficiently engaged with said stationary pulley member such that rotation of the threaded sleeve and bearing assembly with respect to the transmission case cover causes axial adjustment of said stationary pulley member;
    a lock feature positioned to lock the threaded sleeve and bearing assembly in a selected rotational position, thereby preventing said stationary pulley member from moving axially; and
    a bearing cover connected to the transmission case cover over the threaded sleeve and bearing assembly, said bearing cover including the lock feature thereon;
    wherein said lock feature comprises an integral lock tab extending from the bearing cover.

3. In a continuously variable transmission (CVT) having first and second pulley pairs each including a stationary and a movable pulley member configured to engage a drive belt extending between the first and second pulley pairs, a method of axially positioning a respective stationary pulley member comprises:
    providing a transmission case cover having a threaded aperture therein;
    providing a threaded sleeve and bearing assembly on the stationary pulley member of the first pulley pair and threadedly engaged with said threaded aperture;
    rotating the threaded sleeve and bearing assembly with respect to the transmission case cover to thereby axially adjust said stationary pulley member; and
    locking the threaded sleeve and bearing assembly in a selected rotational position to thereby prevent said stationary pulley member from moving axially;
    wherein said locking step comprises engaging a lock feature with one of a plurality of slots circumferentially spaced around the threaded sleeve and bearing assembly.

4. The method of claim 3, wherein said step of engaging a lock feature comprises positioning a bearing cover having an integral lock tab over the threaded sleeve and bearing assembly such that the integral lock tab engages said one of the plurality of slots.

5. The method of claim 3, wherein each said stationary member has a distal end, and the method further comprises measuring the axial position of each of said distal ends, and selecting which one of said plurality of slots to engage with the lock feature based upon said measured axial positions.

6. In a continuously variable transmission (CVT) having first and second pulley pairs each including a stationary and a movable pulley member configured to engage a drive belt extending between the first and second pulley pairs, a method of axially positioning a stationary pulley member comprises:
    providing a transmission case cover having a threaded aperture therein;
    providing a threaded sleeve and bearing assembly on the stationary pulley member of the first pulley pair and threadedly engaged with said threaded aperture, said threaded sleeve and bearing assembly having a plurality of slots formed therein and spaced circumferentially around the threaded sleeve and bearing assembly;
    measuring an axial position of the distal end of each said stationary member;
    selecting which one of said plurality of slots to engage with a lock feature based upon said measured axial position;
    rotating the threaded sleeve and bearing assembly with respect to the transmission case cover to thereby axially adjust said stationary pulley member; and
    locking the threaded sleeve and bearing assembly in a selected rotational position by engaging the lock feature with said selected one of said plurality of slots to thereby prevent said stationary pulley member from moving axially.

* * * * *